United States Patent
Mir et al.

(10) Patent No.: US 6,392,418 B1
(45) Date of Patent: May 21, 2002

(54) TORQUE CURRENT COMPARISON FOR CURRENT REASONABLENESS DIAGNOSTICS IN A PERMANENT MAGNET ELECTRIC MACHINE

(75) Inventors: Sayeed A. Mir, Saginaw; Dennis B. Skellenger, Vassar; Roy Alan Mc Cann, Saginaw; Mark Philip Colosky, Vassar, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 69 days.

(21) Appl. No.: 09/663,448

(22) Filed: Sep. 15, 2000

Related U.S. Application Data

(60) Provisional application No. 60/154,054, filed on Sep. 16, 1999.

(51) Int. Cl.[7] .......................... G01R 31/00; G01B 7/30
(52) U.S. Cl. ............ 324/503; 324/207.17; 324/207.25; 318/716; 318/439
(58) Field of Search ......................... 324/503, 207.17, 324/207.25; 318/716, 439

(56) References Cited

U.S. PATENT DOCUMENTS

| | | | |
|---|---|---|---|
| 5,589,805 A | * 12/1996 | Zuraski et al. | 332/109 |
| 5,625,239 A | 4/1997 | Persson et al. | 310/68 B |
| 5,625,557 A | * 4/1997 | Colosky | 701/35 |
| 5,919,241 A | * 7/1999 | Bolourchi et al. | 701/41 |
| 6,002,226 A | * 12/1999 | Collier-Hallman et al. | 318/439 |
| 6,104,150 A | 8/2000 | Oohara et al. | 318/254 |
| 6,208,109 B1 | * 3/2001 | Yamai et al. | 318/716 |

OTHER PUBLICATIONS

Francesco Parasiliti, Roberto Retrella, Marco Tursini, "Low Cost Phase Current Sensing in DSP Based AC Drives," University of L'Aquila, L'Aquila, Italy, pp. 1284–1289, 1999.

Frede Blaabjerg, John K. Pedersen, Ulrik Jaeger, and Paul Thoegersen, IEEE Transactions On Industry Applications, vol. 33, No. 5, Sep./Oct. 1997, Single Current Sensor Technique in the DC Link of Three–Phase PWM–VS Inverters: A Review and a Novel Solution, pp. 1241–1249.

* cited by examiner

*Primary Examiner*—N. Le
*Assistant Examiner*—Wasseem H. Hamdan
(74) *Attorney, Agent, or Firm*—Edmund P. Anderson

(57) ABSTRACT

A method and system for diagnostics and ascertaining status of an electric machine coupled to a polyphase bus. The method and system include: detecting a rotational position with a position encoder coupled to the electric machine; controlling an inverter having an input coupled to a direct current bus and an output coupled to the polyphase bus, where the inverter is responsive to commands from a controller coupled to the inverter and to the position encoder. The method and system further include measuring a current from the direct current bus; capturing a torque current; calculating a current error; establishing a bound limit for the torque current; comparing the current error to the bound limit. The method and system also include: determining whether a fault exists by evaluating if the bound limit has been exceeded; incrementing a fault counter if a fault exists; decrementing a fault counter if no fault exists; and indicating a failure if the fault counter exceeds a predetermined limit.

29 Claims, 11 Drawing Sheets

TORQUE CURRENT COMPARISON FOR CURRENT REASONABLENESS DIAGNOSTICS IN A PERMANENT MAGNET ELECTRIC MACHINE

CROSS-REFERENCE TO RELATED APPLICATIONS

This application claims the benefit of U.S. provisional application No. 60/154,054, filed Sep. 16, 1999 the contents of which are incorporated herein by reference.

TECHNICAL FIELD

This invention relates to permanent magnetic electric machine, and more particularly, to a torque current comparison for current reasonableness diagnostics.

BACKGROUND OF THE INVENTION

Most modern vehicles have power steering in which the force exerted by the operator on the steering wheel is assisted by hydraulic pressure from an electric or engine-driven pump. The rotary motion of the steering wheel is converted to linear motion in a steering gear. The force applied to the steering wheel is multiplied by the mechanical advantage of the steering gear. In many vehicles, the steering gear is of a rack and pinion type, while in others it is recirculating ball type.

Electric power steering is commonly used in the hybrid vehicles to improve fuel economy. This is accomplished through the reduction of losses inherent in traditional steering systems. When operating at low speeds, hydraulic assist provides satisfactory feel and response characteristics and accommodates the excess capacity required for high-speed operation by the constant circulation of hydraulic fluid through a directional bypass valve. This bypass flow combined with system backpressure expends power needlessly from the vehicle powerplant. These losses are also a function of the rotational speed of the pump. Thus, hydraulic efficiency decreases with engine speed. Average losses under a no steering, zero speed condition can exceed 100 Watts.

Alternatively, electric power steering requires power only on demand. The electronic controller requires much less power under a no steering input condition. This dramatic decrease from conventional steering assist is the basis of the fuel economy savings. Electric power steering has several additional advantages. The steering feel provided to the operator has greater flexibility and adaptability. Overall system mass savings may also be achieved. Electric power steering is powerplant independent, which means it can operate during an all electric mode on a vehicle.

Furthermore, it is known in the art relating to electric motors that polyphase permanent magnet (PM) brushless motors excited with a sinusoidal field provide lower torque ripple, noise, and vibration when compared with those excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. Such deviations usually result in parasitic torque ripple components at various frequencies and magnitudes. Various methods of torque control can influence the magnitude and characteristics of this torque ripple.

One method of torque control for a permanent magnet motor with a sinusoidal, or trapezoidal back EMF is accomplished by controlling the motor phase currents so that the current vector is phase aligned with the back EMF. This control method is known as current mode control. In this a method, the motor torque is proportional to the magnitude of the current. However, current mode control has some drawbacks, in that it typically requires a complex controller for digital implementation and processing. The controller also requires multiple A/D channels to digitize the feedback from current sensors, some of which need to be placed on at least some phases for phase current measurements. Another drawback of current mode control is its sensitivity to current measurement errors, which cause torque ripple to be induced at the fundamental frequency.

Another method of torque control is termed voltage mode control. In voltage mode control, the motor phase voltages are controlled in such a manner as to maintain the motor flux sinusoidal and voltage rather than current feedback is employed. Voltage mode control also typically provides for increased precision in control of the motor, while minimizing torque ripple. One application for an electric machine using voltage mode control is the electric power steering system (EPS) because of its fuel economy and ease-of-control advantages compared with the traditional hydraulic power steering. However, commercialization of EPS systems has been limited due to cost and performance challenges. Among the most challenging technical issues are a pulsation at the steering wheel and the audible noise associated with voltage mode control.

Despite the above-mentioned methods, a more precise or accurate control scheme is needed for some applications. For example, in an electric power steering control system, some unidentified faults or failure of a detection function may cause an undesired condition in the system. Generally speaking, current mode control method involves a trapezoidal system employing feedback, whereas the voltage mode control method involves a sinusoidal system wherein no feedback occurs. That is, current mode control is a closed loop methodology in that a current feedback is used as controlling parameter by the current mode control, while voltage mode control is an open loop control methodology. Therefore, in case of an unidentified fault within the voltage control system, or a change in the motor parameters, steering assist might be undesirably affected. Thus, there is a need in the art for a diagnostic method that enables various control methodologies to be employed while reducing the effect of unidentified faults.

SUMMARY OF THE INVENTION

This disclosure details a method and apparatus for overall monitoring of current in a PM motor in an EPS control system. The control system provides the appropriate power to a PM motor to affect the desired assist while providing diagnostic monitoring. Diagnostic functions monitor torque response of a motor and take appropriate actions should an undesired torque condition be detected.

A diagnostic method, which utilizes a determined set of currents of a PM electric machine, is described. The method includes: a providing an inverter that has a first end coupled to a direct current bus, and a second end coupled to a set of polyphase buses, as well as providing a sensor measuring current from the direct current bus. The method further includes a determining of a set of values representative of motor currents.

A storage medium encoded with machine-readable computer program code for determining a set of phase currents of an electric machine is described. The storage medium includes instructions for measuring a rotary position of an electric machine causing a computer to implement the above current diagnostics method.

BRIEF DESCRIPTION OF THE DRAWINGS

The present invention will now be described, by way of an example, with references to the accompanying drawings, wherein like elements are numbered alike in the several figures in which.

DESCRIPTION OF THE PREFERRED EMBODIMENT

Figure 2:
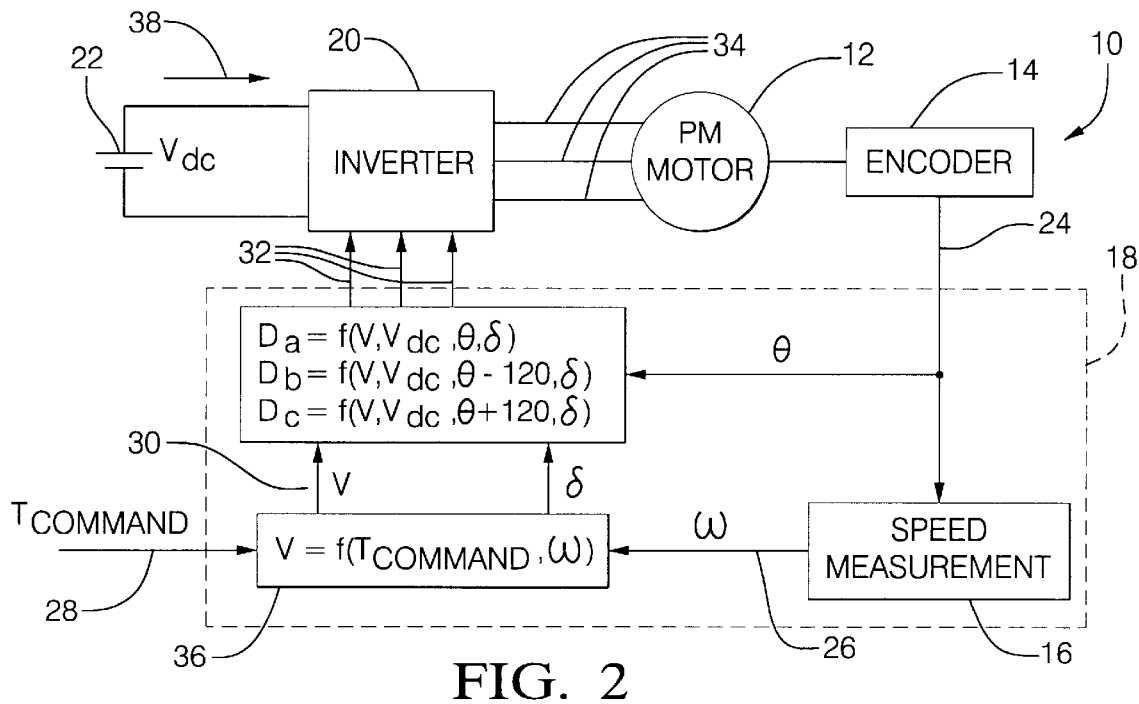
FIG. 2 is a drawing depicting a PM motor system.

Referring now to the drawings in detail, FIG. 2 depicts a PM motor system where numeral 10 generally indicates a system for controlling the torque of a sinusoidally excited PM motor 12. The system includes a rotor position encoder 14, speed measuring circuit 16, controller 18, power circuit or inverter 20 and power source 22.

Figure 1:
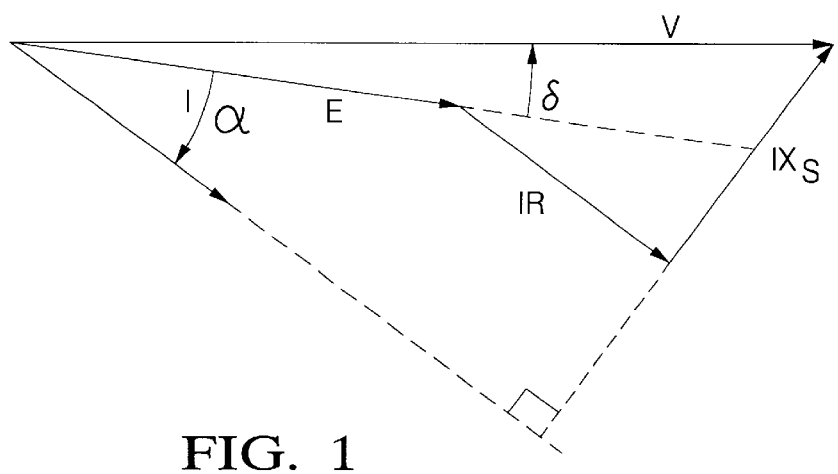
FIG. 1 depicts a phasor relationship of various parameters of a motor.

In the scheme depicted, the torque of the motor 12 is controlled using voltage mode control and without utilizing a current sensor. Instead of controlling the torque producing current, the controller determines the voltage required for producing the desired torque based on motor equations. The voltage mode control method is based on electric machine operation phasor diagram as shown in FIG. 1. Under steady state operating condition, the voltage phasor $\vec{V}$, back EMF phasor $\vec{E}$ and current phasor $\vec{I}$ of a sinusoidally excited PM motor are governed by:

$$\vec{V} = \vec{E} + \vec{I}R + j\vec{I}X_s \quad (1)$$

where R is the winding resistance, $X_s$ is the phase reactance which is equal to the product of motor inductance $L_s$ and the excitation frequency ω. Here, it is assumed that the angle between back EMF phasor $\vec{E}$ and current phasor $\vec{I}$ is α and the angle between the voltage phasor $\vec{V}$ and the back EMF phasor $\vec{E}$ is δ.

Neglecting motor iron losses, friction and windage losses, the output power of the PM motor is equal to $$P = 3IE \cos \alpha \quad (2)$$

and the output torque is $$T = P/\omega_m \quad (3)$$

where $\omega_m = \omega/$(no. of pole pairs). Based on the phasor diagram, it can be derived that $$V \cos \delta = E + IR \cos \alpha + IX_s \sin \alpha \quad (4)$$

$$V \sin \delta = -IR \sin \alpha + IX_s \cos \alpha \quad (5)$$

Solving equations 4 and 5 yields $$\cos \alpha = \frac{(V\cos\delta - E)R + X_s V \sin\delta}{I(R^2 + X_s^2)} \quad (6)$$

By substituting equation 6 into equation 2, it is obtained that $$P = 3E \frac{(V\cos\delta - E)R + X_s V \sin\delta}{R^2 + X_s^2} \quad (7)$$

From equation 7 and equation 3, the motor torque can be expressed as $$T = 3K_e \frac{(V\cos\delta - K_e\omega_m)R + X_s V \sin\delta}{R^2 + X_s^2} \quad (8)$$

where $K_e = \vec{E}/\omega_m$ is the EMF constant. It can be seen from equation 8 that the motor torque is dependent on the motor input voltage $\vec{V}$ the motor parameters and operating speed. Hence, given the motor parameters and speed, by controlling the voltage magnitude $\vec{V}$ and its phase angle δ relative to back EMF $\vec{E}$, it is possible to control the motor torque to a desired value. Equation 8 forms the basis of the control method.

Since it is difficult to deal with the control of two variables at the same time, the angle δ between the back EMF $\vec{E}$ and the voltage $\vec{V0}$ vectors is fixed to a value and then the amplitude of the motor input voltage is adjusted. Thus, the voltage required for any given torque command Tcmd can be calculated by substituting Tcmd into equation 8 and solving for $\vec{V}$:

$$V = \frac{1}{R\cos\delta + X_s\sin\delta}\left(\frac{R^2 + X_s^2}{3K_e}T_{cmd} + ER\right) \quad (9)$$

Equation 9 shows that, for a fixed angle δ between the back EMF $\vec{E}$ and the terminal voltage $\vec{V}$, to maintain a torque equal to the commanded torque with varying speed, the amplitude of motor input voltage has to change. Thus, information of motor parameters, rotor speed and position angle is required, but no current feedback is needed, for the controller to develop a signal to produce a desired motor torque. In the preferred embodiment, the voltage mode control method is implemented for a permanent magnet motor employing the relationships identified in equation 9.

In the voltage mode control, the angle δ has to be chosen properly. By referring to FIG. 1, it can be seen that the phase angle α between the current and the back EMF depends on the angle δ. For different phase angles α, the motor armature current can induce a magnetic flux either opposed to or aligned with the magnet field. Therefore, the choice of δ which results in minimal saturation or demagnetization effects on the permanent magnet field is desired.

In an alternative embodiment for implementation of these equations, a further simplification is made. Since the motor reactance is usually much smaller than the resistance, the inductance term in equation 9 can be ignored. Therefore, only the following simplified control equation need be implemented by the controller:

$$V = \frac{R}{3K_e}T_{cmd} + K_e\omega_m \quad (10)$$

When the motor parameters are perhaps not well understood or when the precision of the motor torque control is less important, equation 10 provides an easily implemented simplified equation. However, if the motor parameters are well understood and greater precision in the control of the motor is necessary, an implementation utilizing the relationships identified in equation 9 are more suitable.

Referring to FIG. 2, for the controller 18 to develop the correct voltage needed to produce the desired torque, the position and speed of the rotor is needed. A rotor position encoder 14 is connected to the motor 12 to detect the angular position of the rotor. The encoder 14 may sense the rotary position based on optical detection or magnetic field variations. The encoder 14 outputs a position signal 24 indicating the angular position of the rotor.

From the position signal 24, a speed measuring circuit 16 determines the speed of the rotor and outputs a speed signal 26. The circuit 16 may include a counter that counts the position signal pulses for a predetermined duration. The count value is proportional to the speed of the motor. For example, if a counter counts the position signal pulses in time intervals of 5 ms and the encoder has a resolution of 2.5 degree, the speed measurement will have a resolution of about 41.7 rpm. The speed signal can also be obtained as the derivative of the position signal from the equation ωm=Δθm/Δt where Δt is the sampling time and Δθm is the change in position during the sampling interval.

The position 24, speed 26, and a torque command signals 28 are applied to the controller 18. The torque command signal 28 is indicative of the desired motor torque. The controller 18 determines the voltage amplitude Vref 30 required to develop the desired torque by using the position, speed, and torque command signals 24, 26, 28, and other fixed motor parameter values. For a three-phase motor, three sinusoidal reference signals that are synchronized with the motor back EMF $\vec{E}$ are required to generate the required motor input voltages. The controller transforms the voltage amplitude signal Vref 30 into three phases by determining phase voltage command signals Va, Vb and Vc from the voltage amplitude signal 30 and the position signal 24 according to the following equations:

$$V_a = V_{ref}\sin(\theta) \quad (11)$$

$$V_b = V_{ref}\sin(\theta - 120°) \quad (12)$$

$$V_c = V_{ref}\sin(\theta - 240°) \quad (13)$$

Motor voltage command signals 32 of the controller 18 are applied to a power circuit or inverter 20, which is coupled with a power source 22 to apply phase voltages 34 to the stator windings of the motor in response to the motor voltage command signals 32. But in order to generate phase voltages 34 with an average sinusoidal shape, switching devices 50 (See FIGS. 4A & 13) of the inverter 20 must be turned on and off for specific durations at specific rotor angular positions. Control of the inverter 20 may be implemented according to any appropriate pulse width modulation (PWM) scheme.

More generally, a voltage control schematic can be shown in FIG. 2. Where V at block 36 may be considered a function of the torque command Tcmd, and the angular speed of the PM motor 12 rotor. And the duty cycles of each phase are functions of phasor voltage V, power bus voltage Vdc, and rotor position θ, as well as angle correction δ. In other words, for a PM brush-less machines used in voltage mode control, a method achieves torque control by regulating the motor voltages. By using the motor parameters (e.g. torque constant K) and speed (e.g., ω), a controller 18 calculates the voltage required to produce a desired torque. The controller 18 is implemented using feedback signals from rotor position 24 and speed 26, which are derived from rotor position encoder 14.

It can be seen from equation (14) that in the PM machine, torque is a function of the motor current for a constant back EMF $\vec{E}$ and phase angle.

$$Tor = 3K\frac{I}{\sqrt{2}}\cos(\alpha) \quad (14)$$

where K is the motor torque constant, $\vec{I}$ is the current vector and (α is the angle between back EMF $\vec{E}$ and current vector $\vec{I}$.

Figure 3:
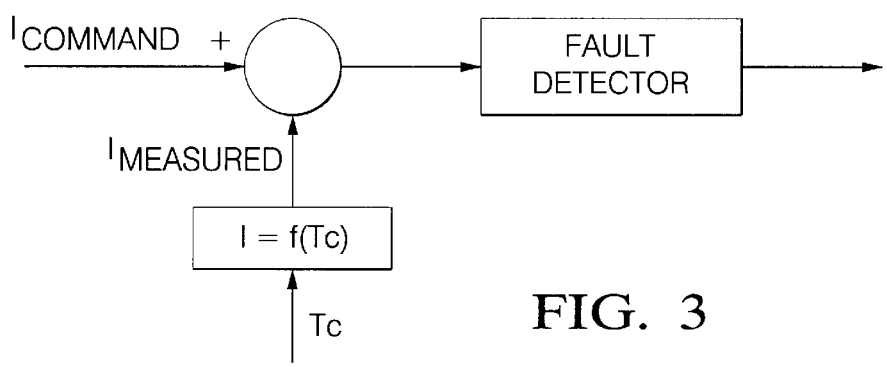
FIG. 3 is a diagram depicting a high-level block diagram of a current reasonableness diagnostic scheme.

It is noted that measured phase current $\vec{I}$ is not used in the control algorithm. As stated earlier, motor current may be adversely affected if the appropriate voltage is not applied to the motor 12. Therefore, some means for monitoring the motor voltage and operation is appropriate. The system can be evaluated for faulty operation of the drive system by monitoring the total DC bus current 38. FIG. 3 depicts a high level block diagram of a diagnostics strategy where the command current is calculated from the command torque and compared to the measured motor current and the error is used to detect any undesired assist in the EPS system. As can be appreciated, in order to implement this diagnostic scheme, an accurate current estimation from the torque command, as well as an accurate current measurement is required. It is now appropriate to turn to the discussion of the limitation of current measurement and current estimation, as well as the details of the fault determination.

A single current sensor 40 (FIG. 2) is used in a DC bus for measuring or evaluating the motor current from the measured DC bus current 38. Thus, the need for a sensor on each and every phase is eliminated. Therefore, a good understanding of the relationship between the bus and the motor current is significant to understanding concept employed herein.

Figure 4:
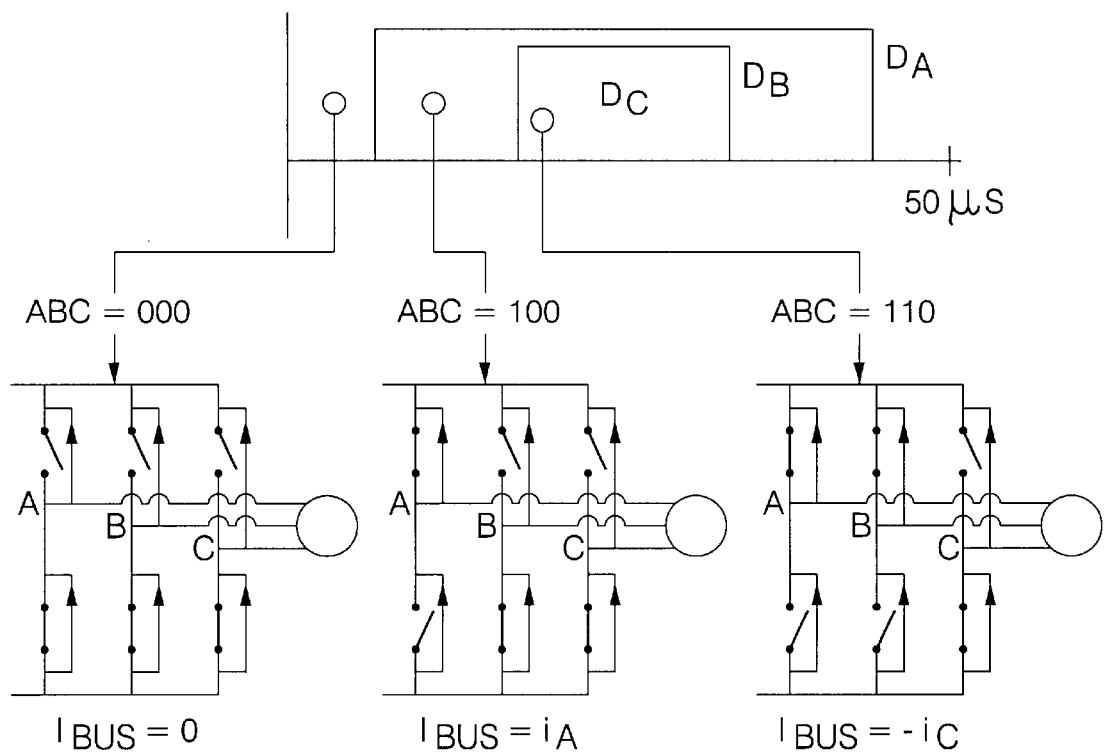
FIG. 4A depicts the inverter switching states and associated switching devices.
FIG. 4B depicts the relationship between the DC Bus currents correlating to Phase currents and an inverter switching device states.
Figure 4:
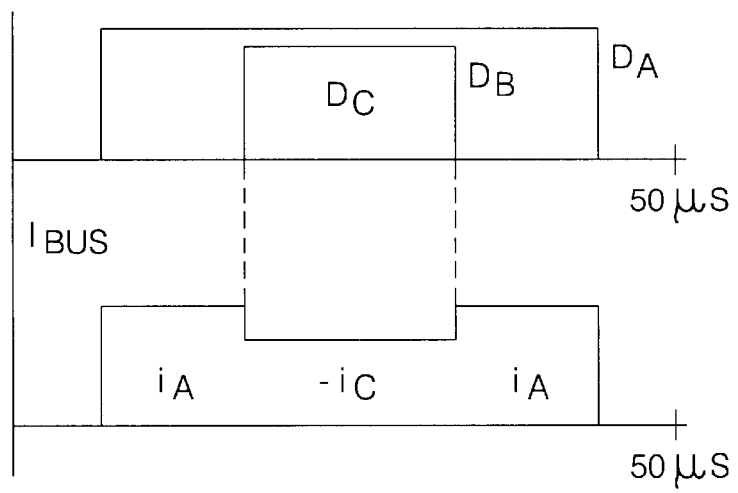

The shape and amplitude of the DC bus current 38 depends upon the angle between phase motor current and phase voltage $\vec{V}$. FIGS. 4A depicts the switching of inverter 20 and the DC bus current 38 during one switching cycle of the inverter 20. FIG. 4B depicts the duty cycles of the switching devices 50 of the inverter 20 and the correlating contribution to the DC Bus current. The inverter 20 goes through six switching states during each inverter switching cycle. The amplitude of bus current is different in each state.

Figure 5:
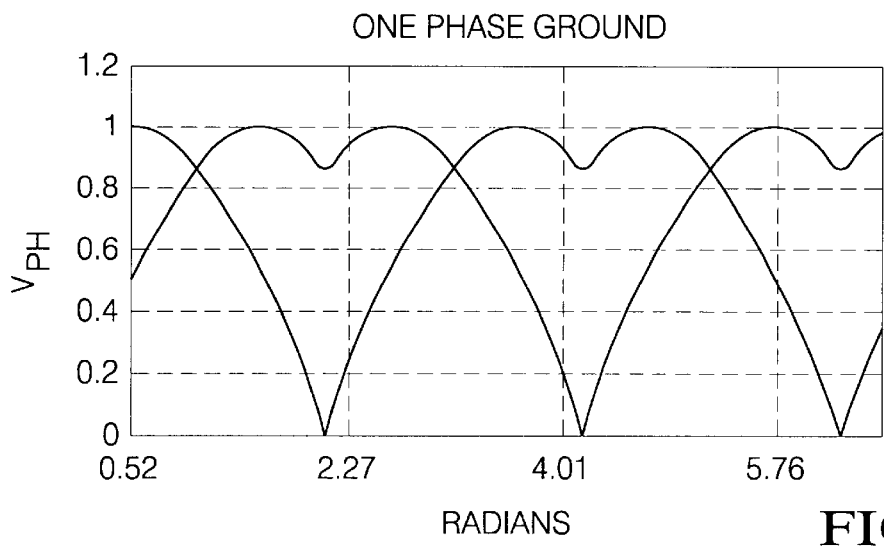
FIG. 5A depicts the phase to ground voltages from the inverter applied to the motor as a function of position.
FIG. 5B depicts the line to line voltages from the inverter applied to the motor as a function of rotational position.
FIG. 5C is a more detailed depiction of the relationship between the DC bus current, the voltage sectors and the correlating phase currents.
FIG. 5D depicts the duty cycles and corresponding phase currents for each of sector in one rotation of the motor and provides a more detailed depiction of the relationship between the DC bus current level and an inverter switching states of FIGS. 4A and 4B.
Figure 5:
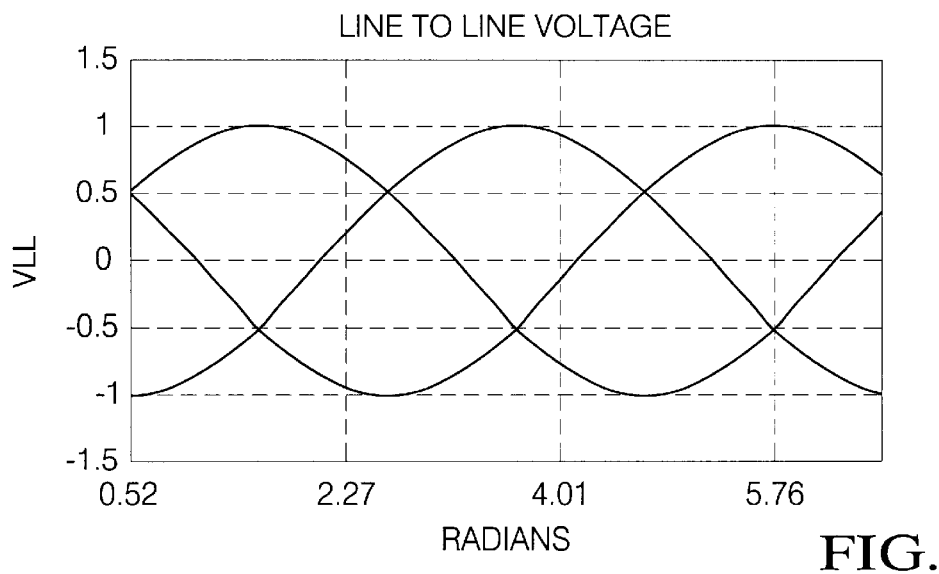
Figure 5:
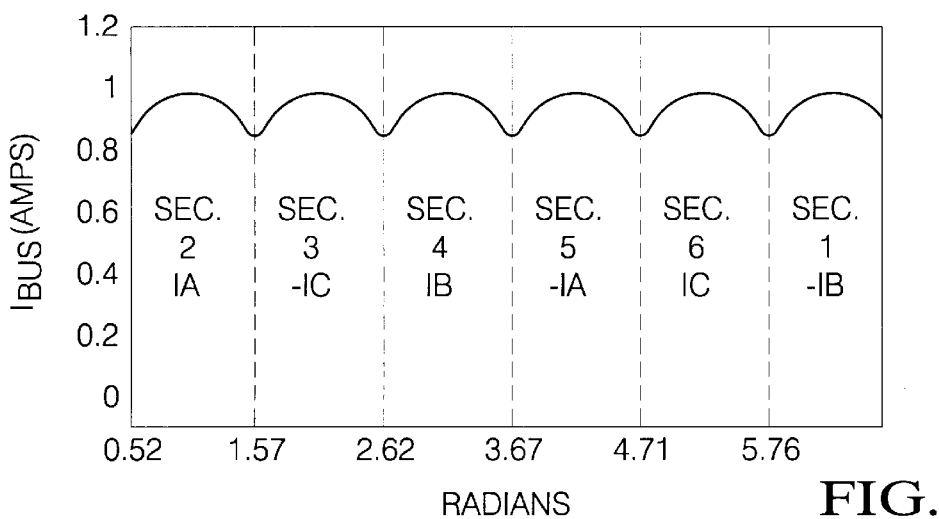
Figure 5:
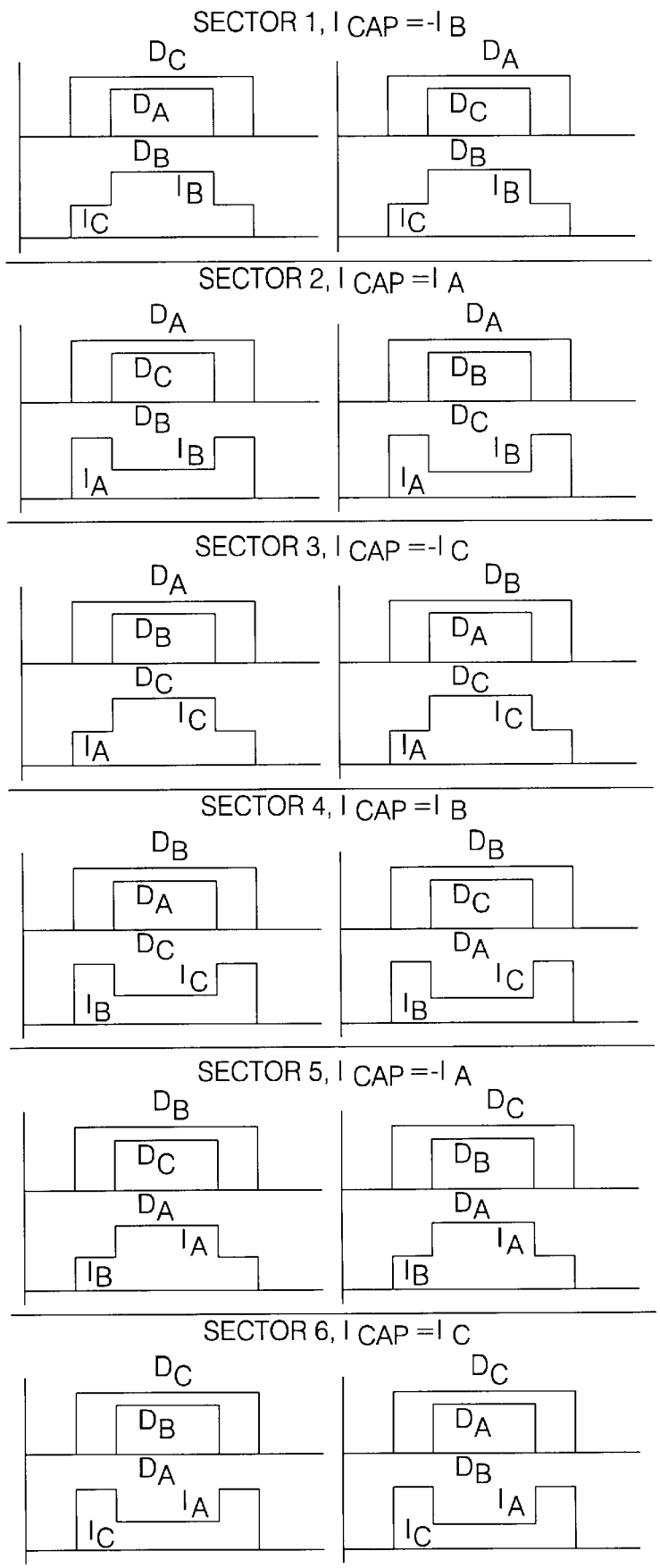
Figure 6:
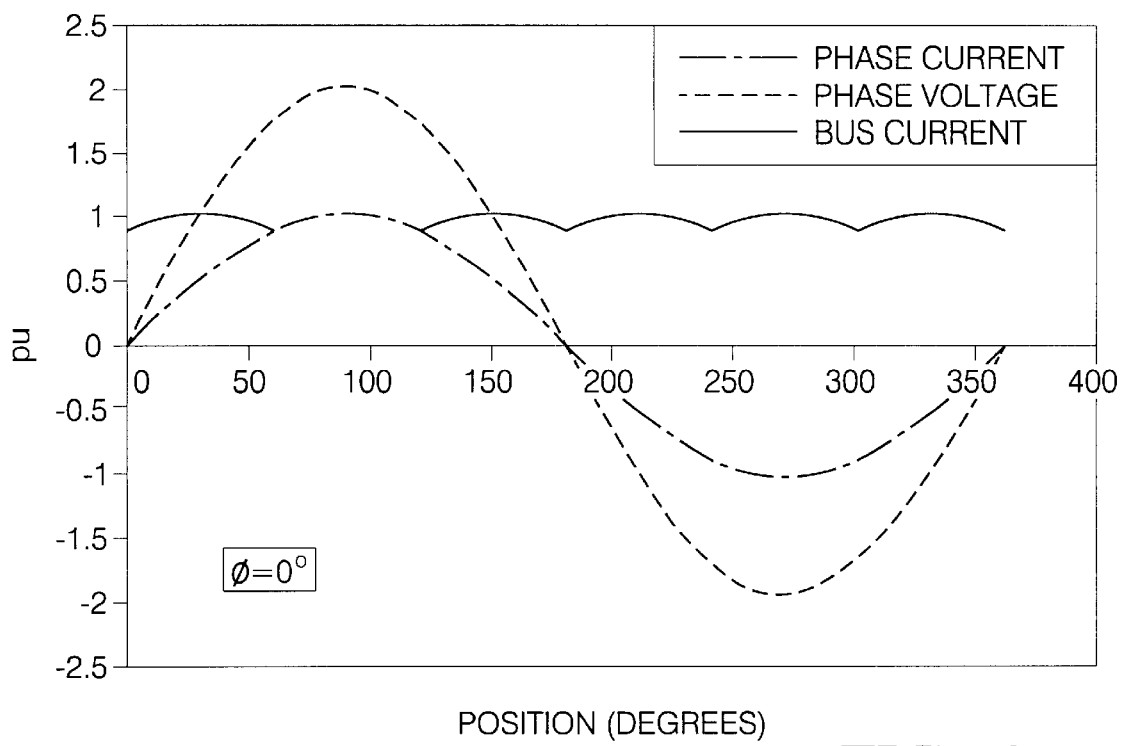
FIG. 6 depicts DC bus current level when phase voltage and current are in phase as a function of rotational position.

FIGS. 5A–5C depict the motor phase voltage $\vec{V}$, phase current $\vec{I}$, and DC bus currents over one electrical cycle. In FIG. 5D, the parameters DA, DB, and DC represent the duty cycles of the switching devices 50 for each of the phases A, B, and C and IA, IB, and IC the corresponding instantaneous phase currents correlating to the DC Bus current at those instances. It can be seen that the DC bus current 38 appears as pulses with a frequency equal to the switching frequency of the inverter 20, The peaks of these high frequency current pulses commutated from phase to phase every 60 electrical degrees of motor position. FIG. 6 depicts the envelope of the bus current pulses at operating points where the phase current $\vec{I}$ and voltage $\vec{V}$ are in phase without phase to grounding employed. Assuming phase symmetry, the bus current waveform envelope repeats every 60 degrees. Thus, the envelope has six times electric frequency of the motor 12. One skilled in the art would appreciate that phase to grounding is a standard utilized in the art where at any given instant a particular phase of the motor 12 is utilized as a ground reference. Such a standard is typically employed to simplify the observation and discussion of the phase currents and voltages.

At operating points where the reactive power is very small the phase current $\vec{I}$ and phase voltage $\vec{V}$ are effectively in phase. The bus current profile follows the phase current.

Figure 7:
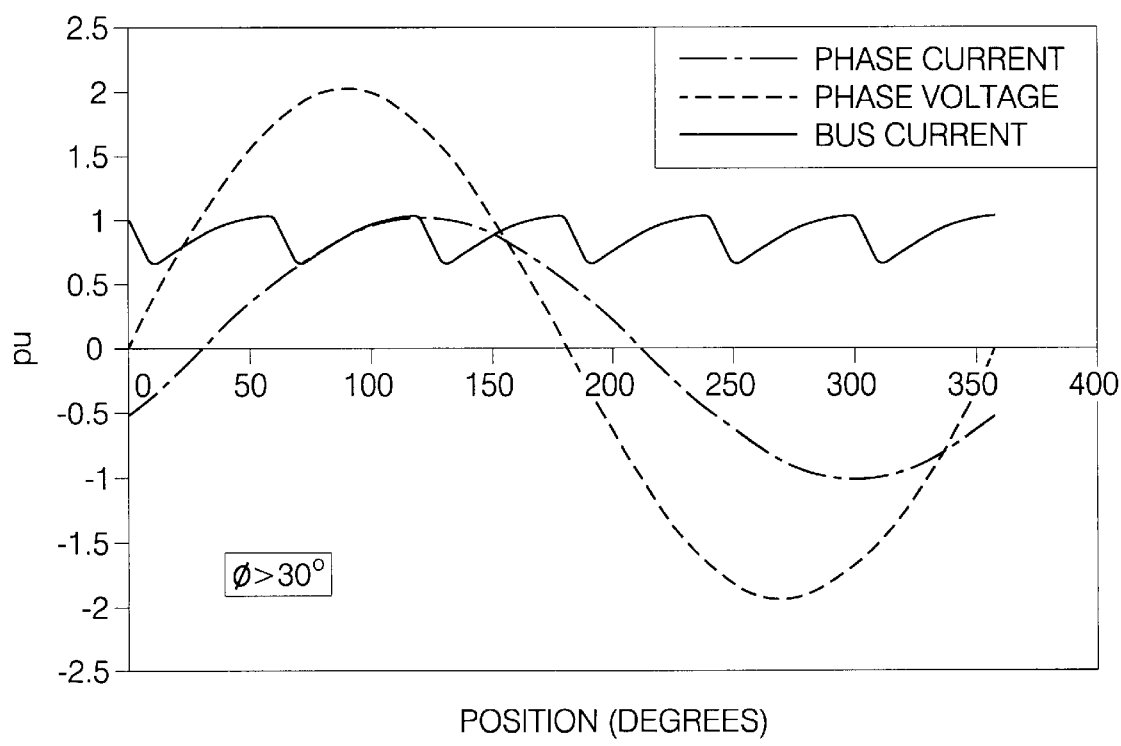
FIG. 7 depicts DC bus current level when phase voltage and current are out of phase, i.e. with phase angle greater than thirty degrees as a function of rotational position.

FIG. 6 also portrays the phase current $\vec{I}$ along with phase voltage $\vec{V}$ and DC bus current profile at such operating points. It should be noted that there is about a 60 degree or about ±30 degree window where the bus current profile follows the phase current $\vec{I}$. As the reactive power increases with an increase in the motor speed, the phase angle $\phi$ between phase voltage $\vec{V}$ and current $\vec{I}$ increases and the switching of the bus current starts to shift as is shown in FIG. 7. When this angle $\phi$ between phase voltage $\vec{V}$ and current $\vec{I}$ becomes greater than about 30 electrical degrees, the bus current profile peak becomes smaller than the phase current $\vec{I}$ peak as is shown in FIG. 7. Thus, within the about ±30-degree window where the bus current profile follows the phase current $\vec{I}$ peak, the buss current magnitude may be characterized by the phase current $\vec{I}$ peak and therefore, the phase current determined by measuring the bus current within the window.

The peak of the bus current profile beyond this point can be characterized by equation 15:

$$I_{bus} = |\vec{I}_{pk} \cos(\phi \pm 30)| \qquad (15)$$

Under the worst case $\phi$ is equal to 90 electric degrees (i.e. completely reactive load) and the peak of bus current profile is given by equation 16:

$$I_{bus} = |\vec{I}_{pk} \cos(60)| = 0.5|\vec{I}_{pk}| \qquad (16)$$

Therefore, the peak of bus current profile within the position window is always within 50% of the peak magnitude of the phase current $\vec{I}$. Further, under typical operating conditions with a PM motor at low speed exhibits a bus current within 10 percent of the peak of the phase current, while at higher speed the bus current is within approximately 40 percent of the peak phase current. Accordingly, for known motor conditions and speeds, the DC bus current 38 may be a viable means for evaluating current reasonableness within predictable error tolerances.

Figure 8:
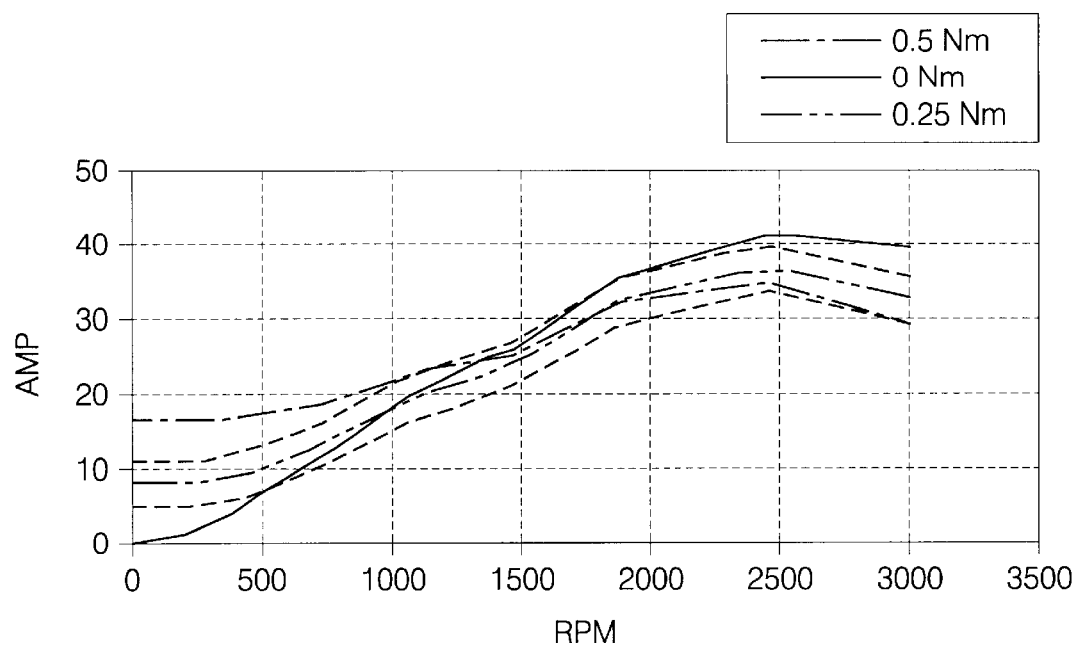
FIG. 8 is a graph depicting motor current as a function of speed at a 0.25 Newton meter torque tolerance level.

The current error can be determined in two ways: first, by comparing the peak of the motor current to the motor current command vector; second, by calculating the instantaneous command current from the current vector and comparing it to the measured current. In both cases, however, knowledge of the angle $\phi$ between the phase voltage $\vec{V}$ and phase current $\vec{I}$ is important for making the transformations. It will be appreciated by those skilled in the art that in a phase advancing scheme employing a field weakening control methodology, the phase advancing angle $\delta$, which is a function of motor speed $\omega$ is modulated as a means to control the current angle $\alpha$. However, this methodology is complicated by the fact that the current angle $\alpha$ fluctuates for each operating point of current $\vec{I}$ and voltage $\vec{V}$. As can be appreciated by those skilled in the art, at low torque levels, current increases quickly with speed. FIG. 8 shows motor currents for a typical PM motor 12 at 0.25 and 0.5 Nm (Newton-meter) as a function of motor speed. It can be seen that the current at higher speeds decreases with an increase in torque. Assuming a measurement tolerance of 3 amps the dotted lines show the measured tolerance bound at 0.25 Nm of torque. It can be seen an error of 0.25 Nm would not be detected above 500 rpm, because the measurement tolerance is too small to be detectable.

Figure 9:
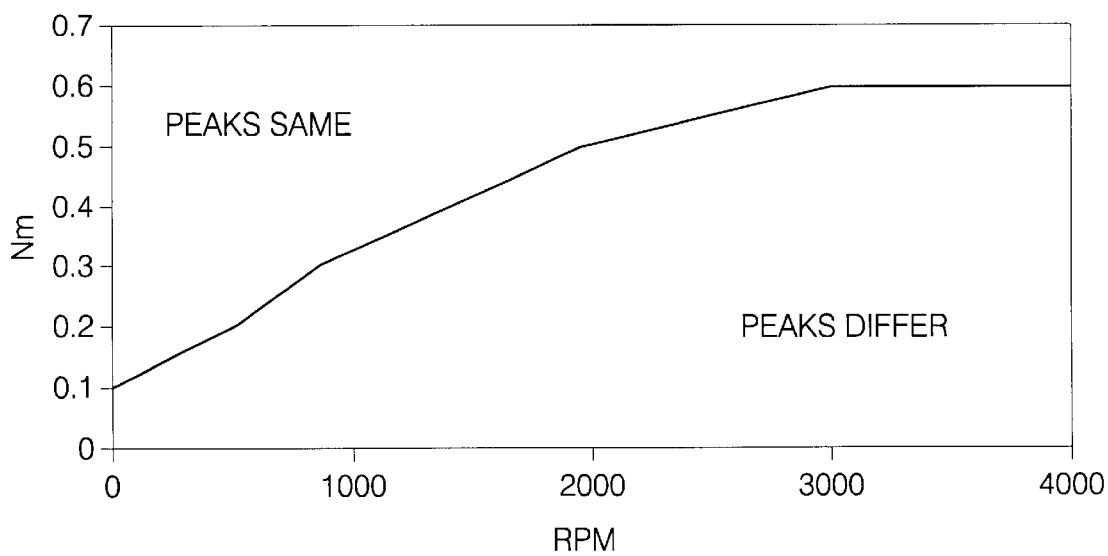
FIG. 9 depicts the speed-torque region where phase current and bus current are comparable.

In addition, the bus current fails to see the peak of the phase current $\vec{I}$ over a significant portion of an operating range. FIG. 9 shows the operating range where the bus current profile peak is less than the phase current $\vec{I}$ for a PM motor. The figure shows that for low torque levels, the current peaks are different even at low speeds. Finally, it will be appreciated that even though the peak of the phase current may be readily detected utilizing the bus current profile, this parameter alone does not easily lead to a current reasonableness diagnostic. The reason being, that the determination of a peak commanded current from a commanded torque of the motor is difficult and cumbersome.

The above-mentioned limitations of the bus current measurement make it difficult to use the bus current, peak, or instantaneous values of the current for comparison. However, the torque current if identifiable is indicative of the bus current and phase current $\vec{I}$ over the interval of interest. Thus, a determination of torque current would be beneficial. The torque-producing component of the current vector $\vec{I}$ is given by equation 17:

$$I_q = \vec{I} \cos(\alpha) \tag{17}$$

where $\vec{I}$ is the current vector or peak of the phase current and α is the angle between back EMF $\vec{E}$ and the current $\vec{I}$. Also the commanded torque current component is given by equation 18:

$$I_q = \text{Torque}/K_t \tag{18}$$

Figure 10:
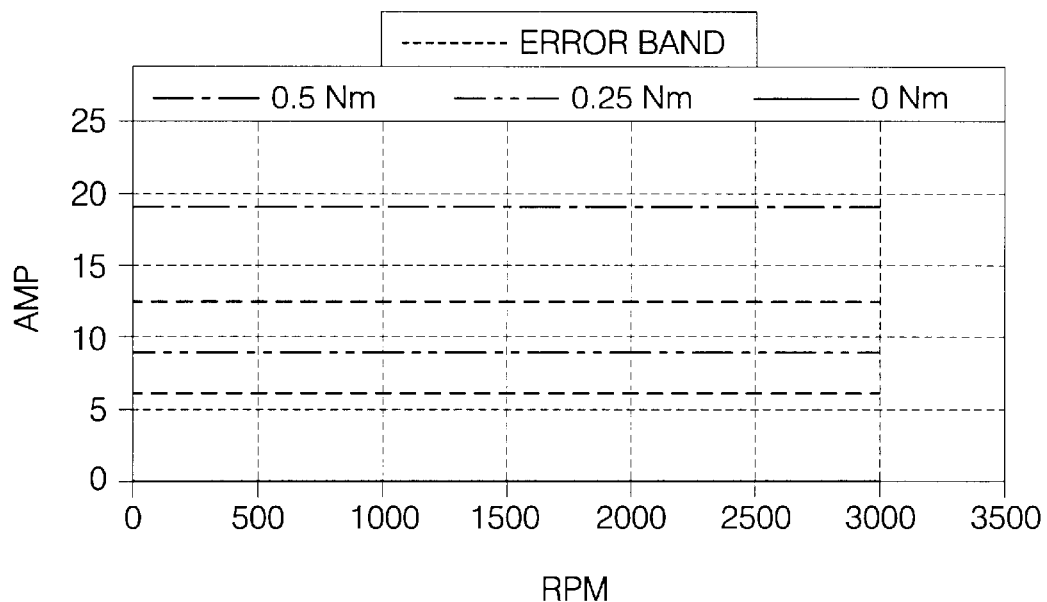
FIG. 10 is a graph depicting a motor torque component as a function of speed current at 0.25 Newton meter tolerance level.

As can be appreciated by those skilled in art, the torque current $I_q$ is independent of the motor speed requirement. Thus, a means to calculate and compare the command torque current is readily achievable. FIG. 10 shows a PM motor torque current tolerance as a function of speed. The measurement error falls within the error band over the entire speed range. It is noteworthy to recognize that it is desirable to ensure that the operating motor torque be maintained within tolerances of the commanded motor torque. The torque current $I_q$ provides a means to observe that the motor torque is in fact within tolerance. Therefore, if the torque current $I_q$ can be ascertained directly from the measured bus current 38, a means of determining a current that facilitates a determination of the current error for current reasonableness diagnostics can be readily achieved. A feature of the preferred embodiment is that it identifies a method for achieving this desirable result.

Figure 11:
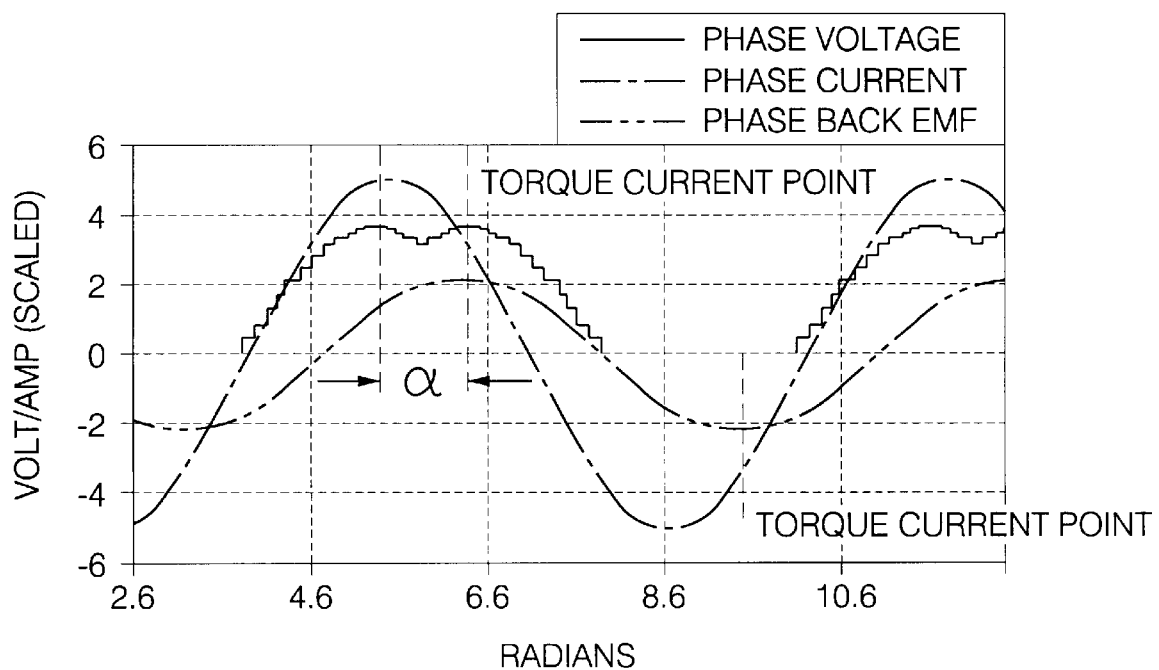
FIG. 11 depicts motor per phase current, voltage, and back EMF scaled waveforms when motor voltage angle δ is less than thirty degrees.
Figure 12:
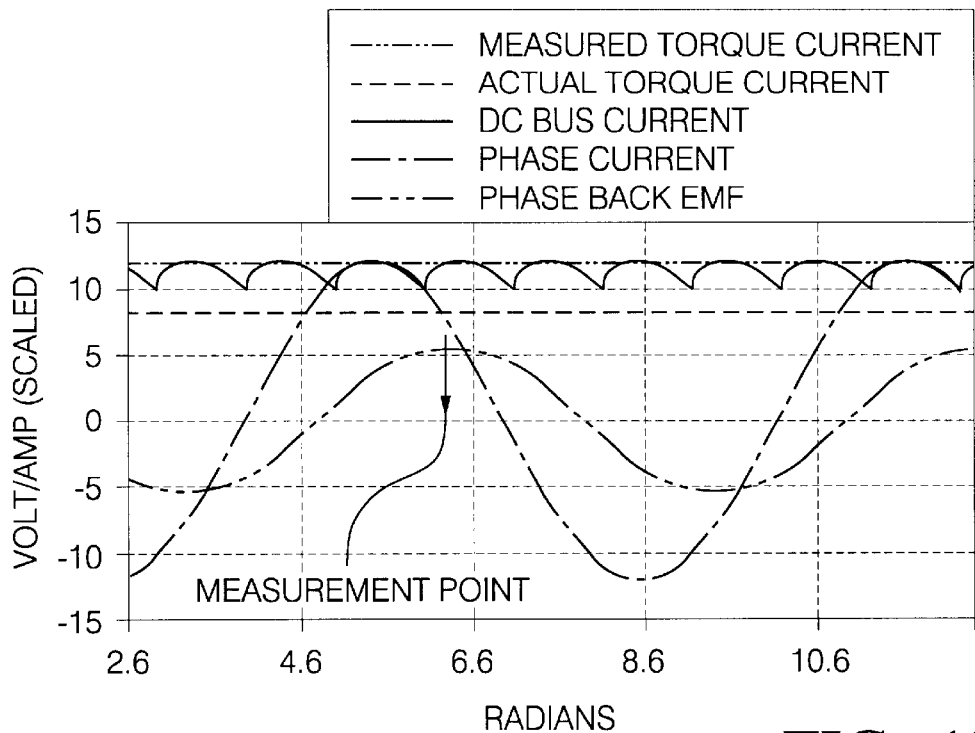
FIG. 12 depicts motor per phase current, voltage, and back EMF scaled waveformns when motor voltage angle δ is greater than thirty degrees.

FIG. 11 shows a single-phase motor current, voltage $\vec{V}$, and back EMF $\vec{E}$ waveforms as a function of rotation angle θ. The instantaneous amplitude of the motor phase current $\vec{I}$ at the peak of the back EMF $\vec{E}$ is equal to I cos(α) where I is the peak amplitude of the motor phase current $\vec{I}$. Therefore, an appropriately timed measurement of the instantaneous motor phase current $\vec{I}$ near the peak of back EMF $\vec{E}$ yields the torque current amplitude. It should also be noted, as mentioned earlier, that the bus current peak is equivalent to the instantaneous phase current peak within the limited window of phase angles. Thus, the torque current $I_q$ can be determined via the bus current 38 by capturing the bus current envelope at the point where the back EMF $\vec{E}$ of the three phases hits its positive or negative peak. The position of the torque current $I_q$ with respect to the phase voltage $\vec{V}$ waveform and therefore the bus current, depends upon the phase advancing angle δ. The peak of the back EMF $\vec{E}$ is within its corresponding phase current $\vec{I}$ window on the bus current envelope as long as the phase advancing angle is less than about 30 electrical degrees. Once the back EMF $\vec{E}$ peak moves beyond it's phase current $\vec{I}$ on the bus current envelope, the captured bus current at that point is not equal to the torque current $I_q$ as shown in FIG. 12. Therefore, it would fail to provide an acceptable measure of current or current error for the operating points for which phase advancing angle δ is greater than about 30 degrees. Under these conditions, either the error tolerance band must be expanded or diagnostics disabled. The accuracy of the measured current is also affected by the resolution of measured motor position. Fortunately, in the preferred embodiment, this effect is minimized by measuring the current near the peak of the phase current $\vec{I}$ waveform due to relatively small slope near the peak point. One skilled in the art would recognize that measurements at other positions would be subject to larger errors due to the sinusoidal shape of the waveform. Therefore, in control schemes where a current vector $\vec{I}$ is controlled to be in phase with the motor back EMF $\vec{E}$ the effects of position resolution are less significant.

Figure 13:
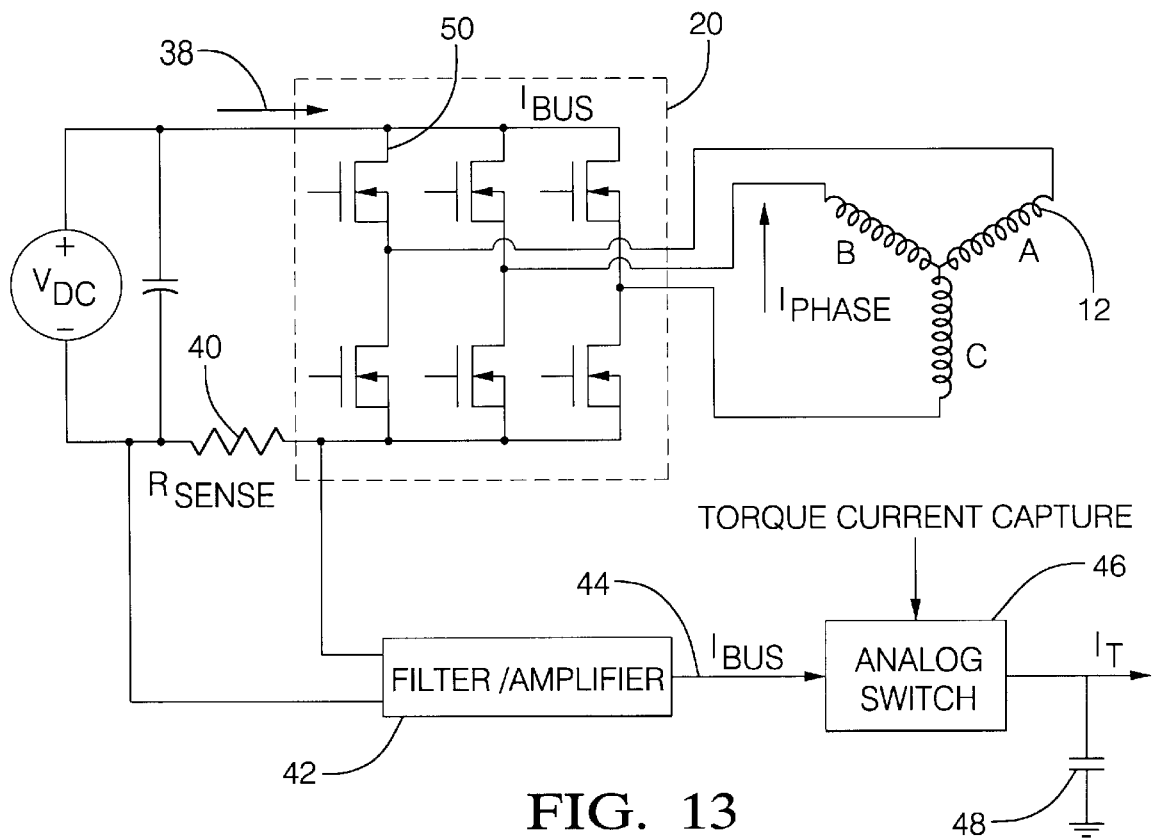
FIG. 13 is an implementation of an embodiment for sensing the torque current.
Figure 14:
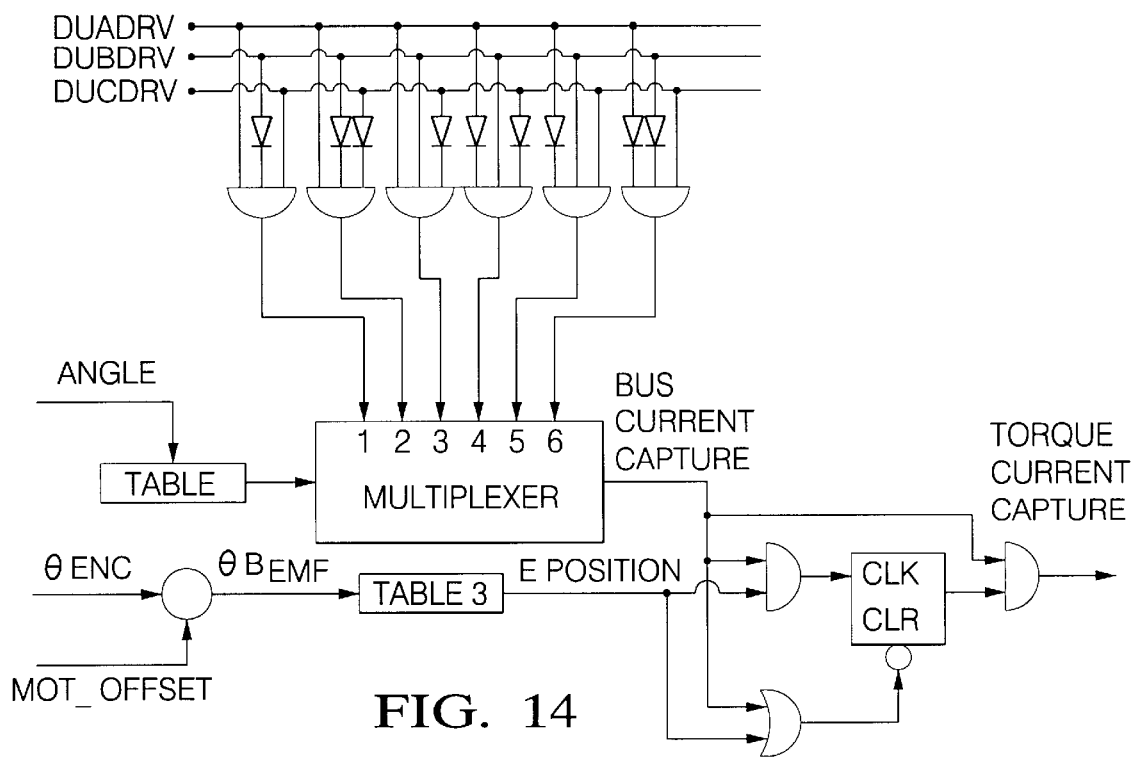
FIG. 14 depicts a logic circuit for generating a torque current capture signal.
Figure 17:
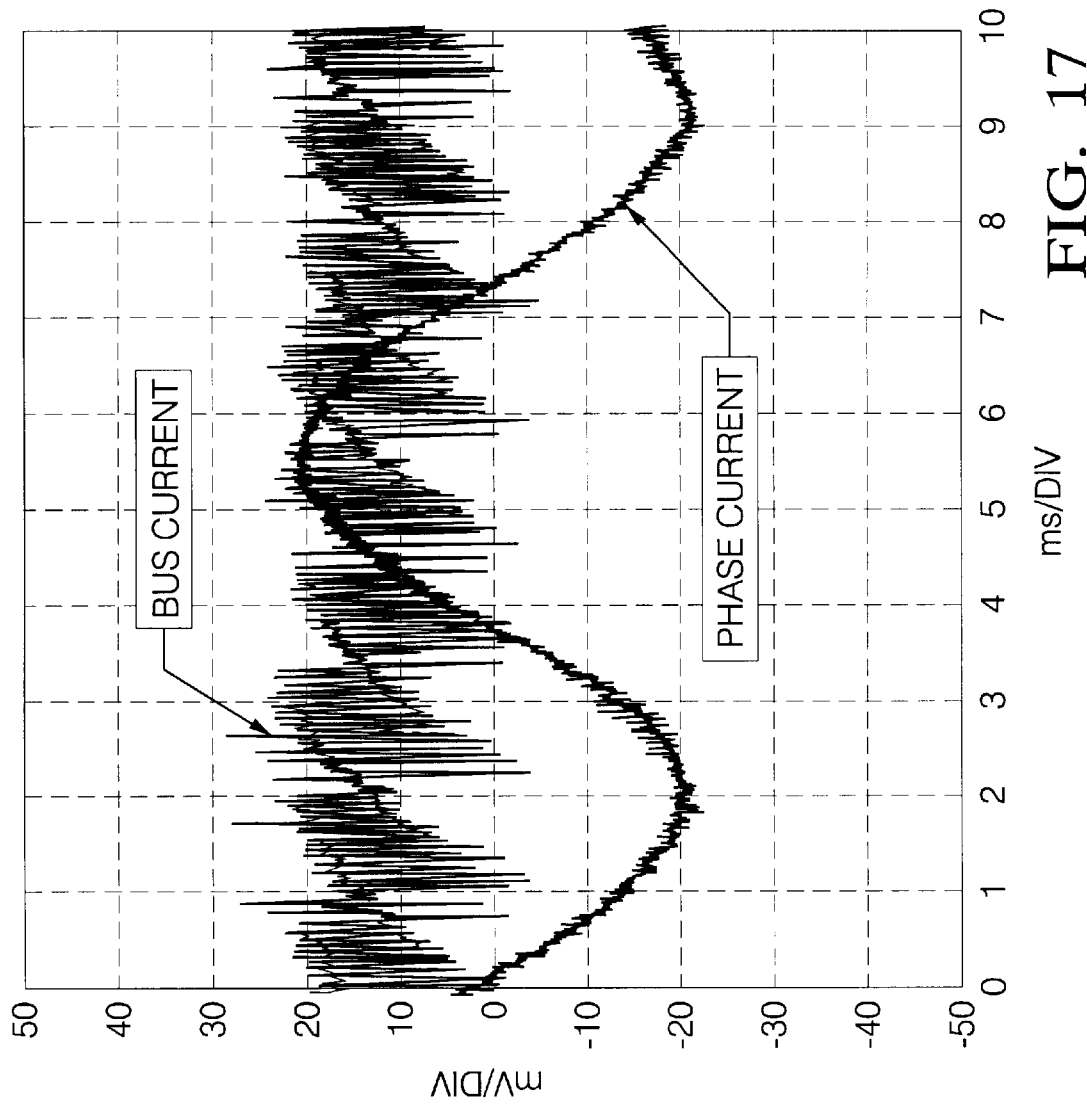
FIG. 17 depicts DC bus current wave-form highlighting the PWM pulses.

FIG. 13 depicts a schematic of an embodiment of a system for the measurement of the torque current $I_q$ from the DC bus current 38. The DC bus current 38 is sensed by way of measuring the voltage across a sense resistance 40, which is filtered and amplified by a filter-amplifier 42. It is noted that the sensed current is in pulse form at a predetermined pulse width modulation (PWM) frequency of the inverter 23, e.g., at 20 KHz. FIG. 17 depicts DC bus current wave-form highlighting the PWM pulses for clarity. A signal representative of the DC bus current 38 termed $I_{bus}$ 44 forms an output of the filter-amplifier 42. The $I_{bus}$ signal 44 is in turn applied into an analog switch 46, which is used to charge a sample and hold capacitor 48 that has its other end grounded. This circuit performs the peak detecting function necessary to identify the envelope of the bus current. The sampling is constrained to a predetermined number of samples, taken only near the peak of the back EMF $\vec{E}$ signal. For example, in a three phase six pole PM motor 12, this sampling takes place six times for every electrical cycle. A torque current capture signal, Torq_Current_Capture is generated by a logic function 100 depicted in FIG. 14. The logic function 100 and processing is typical of a function that may be implemented in a controller 18 (FIG. 2). Such a controller may include, without limitations, a processor, logic, memory, storage, registers, timing, interrupts, and the input/output signal interfaces as required to perform the processing prescribed by the invention herein. The Torq_Current_Capture signal is generated using the gate duty drive signals DUADRV, DUBDRV, and DUCDRV of the upper drive switching devices 50 of the inverter 20 (FIG. 13), the voltage angle δ, and motor position $θ_{enc}$ as sensed by encoder 14 (FIG. 2). The gate duty signals and the voltage angle along with the appropriate logic ensure that sampling of the bus current occurs only at the peaks of the high frequency current pulses.

Table 1 identifies the conditions for sampling the DC bus current pulses and sector generation as a function of the voltage position. The voltage position is the absolute position angle in electrical degrees of the voltage $\vec{V}$ relative to the motor rotation angle. For example, in a three phase six-pole machine, the voltage angle travels through 360 electrical degrees each 120 mechanical degrees of rotation. Thus, neglecting any offsets, and assuming that the back EMF $\vec{E}$ is provides the reference, the voltage angle δ identifies the phase difference between the voltage and the back EMF $\vec{E}$ and the absolute position of the voltage signal is determinable. It is also noteworthy that, the shape and position of these pulses change as a function of the angular position of the motor 12 and the phase angle of the voltage signal. The voltage position is divided into six sectors in a three-phase six-pole context. Again, based upon the assumption that the angle zero of the position corresponds to the zero crossing of phase the 'A' line-to-line voltage going from negative to positive, the peak current corresponds to a particular phase in each of these sectors. This assumption establishes a convention for measurement of the bus current and attributing the bus current to a particular phase current. It is noted that other conventions may be utilized in the art without affecting the concepts identified. The instances or time segment when the high frequency bus current pulses are at their peak depends upon the switching of the inverter 20 (FIG. 13) which can be observed by monitoring the gate signals related to the upper switches 50 of the inverter 20 (FIG. 13).

TABLE 1

Sector generation as a function of the voltage position angle

| Measured Voltage Position Angle in Electrical Degrees | Position_Sector |
|---|---|
| 0–<30 and 330–<360 | 6 |
| 30–<90 | 1 |
| 90–<150 | 2 |
| 150–<210 | 3 |
| 210–<270 | 4 |
| 270–<330 | 5 |

Table 2 identifies the state of the duty signals for each sector when the bus current pulses are at their peak, and thus when the Bus_Current_Capture signal is generated. It may be noted that the Bus_Current_Capture signal allows the capture of the bus current 38 envelope at any instant of time. This facilitates sampling the current for other purposes when desired. These high frequency peaks are captured only when the back EMF $\vec{E}$ sine pulses of the corresponding phase reach their peak. It is noted that in the table, HIGH corresponds to a logic one, and LOW corresponds to logic zero.

TABLE 2

| Position_Sector | Upper Gate Drive A (DUA-DRV) | Upper Gate Drive B (DUB-DRV) | Upper Gate Drive C (DUC-DRV) | Bus_Current_Capture |
|---|---|---|---|---|
| 1 | HIGH | LOW | HIGH | HIGH |
| 2 | HIGH | LOW | LOW | HIGH |
| 3 | HIGH | HIGH | LOW | HIGH |
| 4 | LOW | HIGH | LOW | HIGH |
| 5 | LOW | HIGH | HIGH | HIGH |
| 6 | LOW | LOW | HIGH | HIGH |

Upper gate drive signal for peak bus current pulses at the peak in each sector

Figure 15:
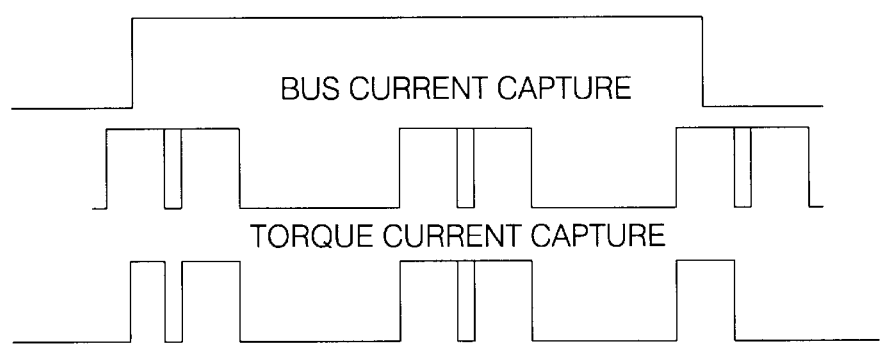
FIG. 15 shows a timing relationship in the generation of torque current capture signal and FIG. 16 depicts the current reasonableness algorithm.

Table 3 identifies the back EMF $\vec{E}$ positions when the DC bus current is captured. A 100-microsecond pulse (E_Position) is generated (in a 20 kHz PWM switching) at each of these positions to trigger the Torq_Current_Capture signal at the appropriate time. The Torq_Current_Capture signal is generated using the Bus_Current_Capture signal and E_Position signal as portrayed in FIG. 14. FIG. 15 portrays the timing interactions and interlocks on the Torq_Current_Capture signal as a function of the Bus_Current_Capture signal and the E_Position signal. Checking the motor position, compensating the position for any offsets, and applying the logic rule stated in Table 3 achieve the capture. The Torque_Current_Capture signal is used to enable the charging the sample and hold capacitor 48 (FIG. 13) capturing the $I_{bus}$ 44 voltage. To avoid the capacitor charging in the transient dips, it is assured that the 100 micro-second pulse does not end with any half Bus_Current_Capture pulses as is depicted by the last pulse in FIG. 15.

TABLE 3

Back EMF $\vec{E}$ position when E_Position pulse is generated

| $\theta_{BEMF}$ |
|---|
| $29 < \theta_{BEMF} < 34$ |
| $61 < \theta_{BEMF} < 66$ |
| $93 < \theta_{BEMF} < 98$ |
| $125 < \theta_{BEMF} < 130$ |
| $157 < \theta_{BEMF} < 162$ |
| $189 > \theta_{BEMF}, \theta_{BEMF} < 2$ |

Figure 16:
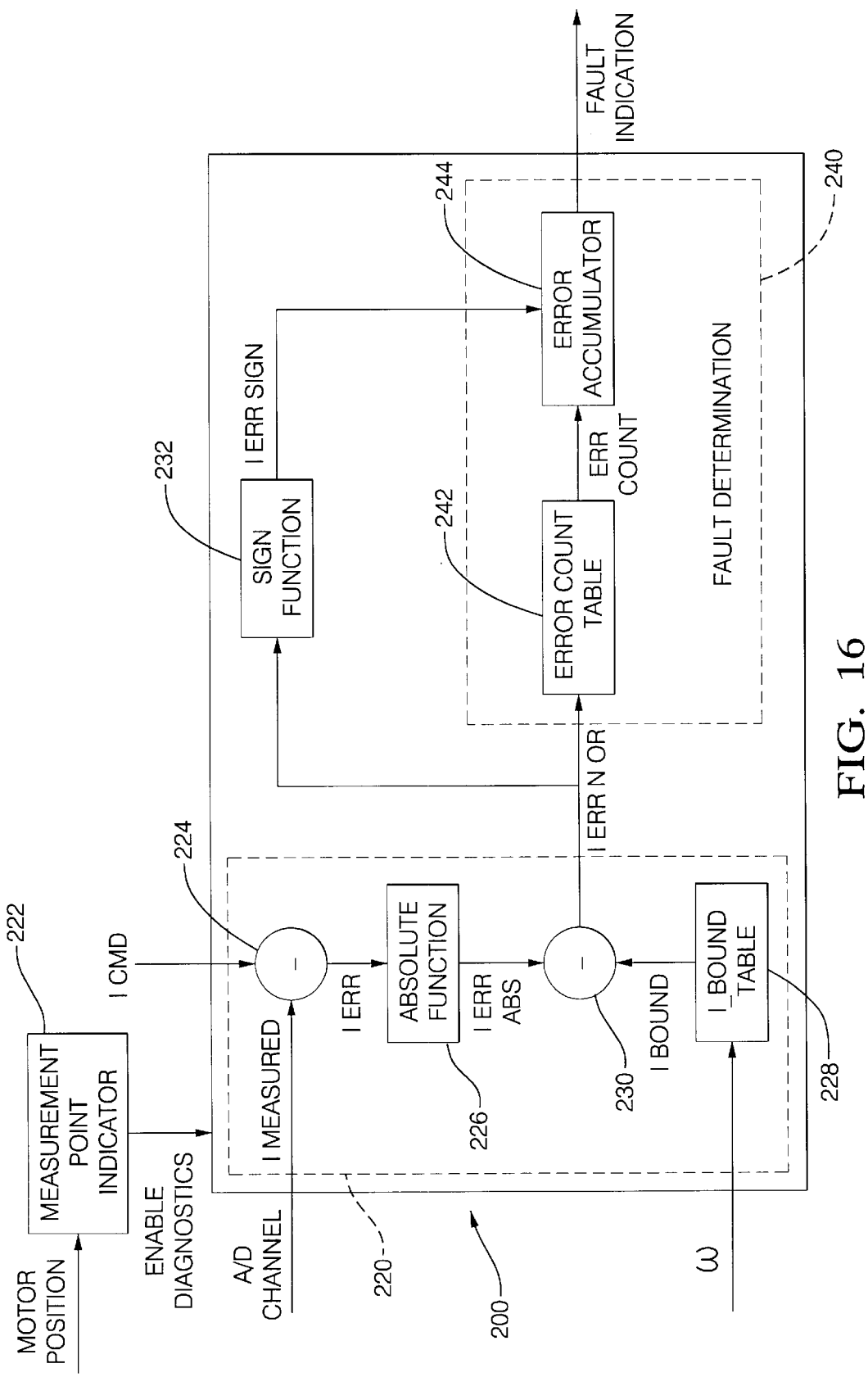

FIG. 16 depicts a block diagram of the process employed to perform the computations for the Current Reasonableness Algorithm. This diagnostic algorithm 200 consists of two sub functions, i.e., the Current Comparison 220, and the Fault Determination 240. The current reasonableness algorithm may be embodied in software executable in a typical controller as identified earlier and may be embodied in a software process as discussed in detail in the following paragraphs.

The inputs to the Current Reasonableness Algorithm are the command current, I_CMD; the high-resolution motor position $\theta_{enc}$; a user defined test parameter for initial setup, Mot_offset; the measured current, I_measured; and the calculated motor velocity, ω. The output from the Current Reasonableness Algorithm is a signal Fault_Indication representing whether fault has been detected.

In an embodiment, the Current Reasonableness diagnostic algorithm is executed only when a new value of measured current becomes available as dictated by the motor position $\theta_{enc}$ to ensure valid data is being evaluated. Note also that the value for I_measured should be sampled at a defined, calibratable, high-resolution motor position, namely, every sixty degrees of motor electrical position. Additionally, data processing should be performed following each sampling when a new measurement of current is available.

Referring to FIG. 16, the measurement Point Indicator 222 function identifies when the current reasonableness diagnostics are to be executed. The execution is accomplished by activating the Enable_Diagnostics based upon the motor position $\theta_{enc}$ transitioning the angle identified in Table 4. A "1" in the table indicates an activated case for the Enable_Diagnostics. For all the other positions not shown in Table 4 Enable_Diagnostics is inactive and set to "0".

When the motor position $\theta_{enc}$ crosses the points when the torque current Iq is captured by the current sensing circuit, the A/D conversion of the input torque current Iq is enabled. The measured current I_measured is then compared at summer 224 with the command torque current (I_CMD) to determine the reasonableness of the measured current. The command torque current I_CMD is estimated from the command torque as shown in equation 19. (19)

$$I\_CMD = Tcmd/Ke \quad (19)$$

where Ke=Torque constant of the motor

The I_CMD value of previous 2-millisecond loop may be used for comparison to avoid data timing induced errors.

TABLE 4

Current Reasonableness Enable Table

| Motor Position Transitions | Enable_Diagnostics |
|---|---|
| 30° | 1 |
| 90° | 1 |
| 150° | 1 |
| 210° | 1 |
| 270° | 1 |
| 330° | 1 |

Referring again to FIG. 16, the comparison yields an error current I_ERR, whose magnitude is summed with a bounding error at summer 230, which establishes the torque error tolerance. With regard to the Absolute Function 226, where the I_ERR is converted into an unsigned magnitude only value as I_ERR_ABS in preparation for comparison versus the error limit I_Bound. Turning now to the processes of the I_Bound Table 228 wherein a calibratable function for calculating and establishing the current limit, I_Bound as a function of the motor velocity ω is identified. This function provides a method of compensating the error tolerance for increased motor velocity ω. In an embodiment, a linear interpolation look-up table is employed. It will be appreciated that such a look-up table is commonly utilized in the art for simplicity and speed of execution. Further, such a table allows for significant flexibility during calibration to establish the necessary limits on the process across multiple platforms and vehicles. It will be further appreciated by those skilled in the art, that an interpolation table has been described as an illustration only, and as such are not to be construed as limiting to the claims. It should be understood that various modifications and substitutions may be made to the embodiments without departing from the spirit and scope of the invention.

Continuing with FIG. 16, the I_Bound value is subtracted at summer 230 from I_ERR_ABS to yield the error I_ERR_NOR, which represents the velocity corrected error between the commanded and measured torque currents. An error is generated if the measured current I_measured, exceeds the magnitude of the sum of the command current, I_CMD and the error bound I_Bound, i.e., I_measured>abs (I_CMD +/−Error bound). The flag I_ERR_SIGN is generated in the Sign Function 232 process to indicate the sign of the error signal I_ERR_NOR for use in the Fault_Determination 240 process.

In an embodiment, operational requirements dictate that the torque must be within 5 Nm of operator commanded torque at the handwheel, for acceptable vehicle operator's hand feel and effective steering of the vehicle. The torque error tolerance may vary depending upon the size of the vehicle, design of the steering system, vehicle speed, and other parameters. The error bound is calculated by converting a hand wheel tolerance into motor torque tolerance using the gear ratio and then calculating the equivalent torque current using equation (19). A fault is logged for a current error amplitude and duration outside the tolerance range. Such a fault indicates that motor torque is not following commanded and improper EPS functionality.

The Fault_Determination 240 process logs a fault if continuous errors are present for a predetermined number of occurrences. The Fault_Determination 240 process utilizes an error accumulation routine to determine when the fault may be considered detected. The error accumulation routine has two functions, the Error Count Table 242 and the actual Error Accumulator 244. Each violation of the current reasonableness test criteria established by the value of the I_ERR_NOR signal increments the Error Accumulator 244 counter by a predetermined number of counts PSTEP. Each successful test reduces the counter by a predetermined number of counts; NSTEP. The reduction of error is limited to zero counts to avoid arithmetic boundary issues. The Error Accumulator 244 evaluates the I_ERR_SIGN flag. If the flag is positive, indicating a violation, PSTEP is added, if the flag is negative, NSTEP is added. When the Error Accumulator 244 exceeds a predetermined value, a fault is considered detected. When such a fault is detected, the Error Accumulator 244 provides an output indicating the fault.

The PSTEP counts are a function of the magnitude of error, I_ERR_NOR. The maximum error corresponds to the maximum value of PSTEP counts. The maximum value of I_ERR_NOR and thus the maximum value of PSTEP are specific to each particular EPS system utilization and are derived following calibration testing. The values are selected based upon the vehicle employed as well as the particular details of the controller employed. In an embodiment the maximum value of PSTEP counts corresponds to the detectable torque error within a single controller cycle, while NSTEP is determined based on the duration the effect of an identified fault need be considered. On e skilled in the art will appreciate that such methods of defining fault counters in common and that numerous variations are possible to achieve the same desired functionality. The Error Count Table 242 determines the value PSTEP based on the magnitude of the error.

The algorithm utilizes a calibrating function, Error Count Table 242, to determine the value of error counts (PSTEP counts) required for the Error Accumulator 244. In an embodiment, a linear interpolation look-up table is employed. Again, it will be appreciated that such a look-up table is commonly utilized in the art for simplicity, speed of execution, and flexibility.

It is noted that although this invention is suitable for PM motor voltage control. Other types of controls such as non-PM motor, or current mode, may be suitable as well. For example, current mode control can be used as a backup to the existing feedback system inherent in current mode control. In other words, so long as some feedback of rotor position and speed information (note that speed may be derived from position information), the instant invention may be suitably applied.

The disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of diagnostics for ascertaining status of an electric machine coupled to a polyphase bus, the method comprising:

detecting a rotational position of said electric machine with a position encoder coupled to said electric machine;

controlling an inverter comprising a plurality of switching devices, said inverter having an input coupled to a direct current bus and an output coupled to said polyphase bus, said inverter responsive to commands from a controller coupled to said inverter and to said position encoder;

measuring a current from said direct current bus;

capturing a torque current;

calculating a current error establishing a bound limit for said torque current;

comparing said current error value to said bound limit;

determining whether a fault exists by evaluating if said bound limit has been exceeded and generating a current error;

incrementing a fault counter by a first predetermined count if said fault exists;

decrementing said fault counter by a second predetermined count if no fault exists; and indicating a failure if said fault counter exceeds a predetermined limit.

2. The method of diagnostics of claim 1 wherein said electric machine comprises a permanent magnetic motor and said position encoder includes a rotor position sensor.

3. The method of diagnostics of claim 1 wherein said electric machine is a permanent magnet DC brushless motor characterized by a sinusoidal magnetic field excitation.

4. The method of diagnostics of claim 1 wherein said current error is determined by subtracting from the torque current a value representative of a current command.

5. The method of diagnostics of claim 1 wherein said bound limit is compensated for motor speed.

6. The method of diagnostics of claim 1 wherein said first predetermined count is a function of said current error.

7. The method of diagnostics of claim 1 wherein said second predetermined count is a function of said current error.

8. A diagnostics system for ascertaining status of an electric machine, the system comprising:

said electric machine coupled to a polyphase bus, including a position encoder coupled to said electric machine to detect rotational position;

an inverter having an input coupled to a direct current bus, and an output coupled to said polyphase bus, responsive to commands from a controller;

said controller coupled to said inverter and to said position encoder;

a sensor to detect a current from said direct current bus;

said controller capturing a torque current;

said controller calculating a current error said controller establishing a bound limit for said torque current;

said controller comparing said current error value to said bound limit;

said controller determining whether a fault exists by evaluating if said bound limit has been exceeded and generating a current error;

said controller incrementing a fault counter by a first predetermined count if said fault exists;

said controller decrementing said fault counter by a second predetermined count if no fault exists;

said controller providing a fault indication to declare a failure if said fault counter exceeds a predetermined limit.

9. The diagnostics system of claim 8 wherein said electric machine comprises a permanent magnetic motor and said position encoder includes a rotor position sensor.

10. The diagnostics system of claim 8 wherein said electric machine is a permanent magnet DC brushless motor characterized by a sinusoidal magnetic field excitation.

11. The diagnostics system of claim 8 wherein said inverter is comprised of switching devices coupled to and responsive to commands from said controller.

12. The diagnostics system of claim 8 wherein said controller determines said current error by subtracting from the torque current a value representative of a current command.

13. The diagnostics system of claim 8 wherein said bound limit is compensated for motor speed.

14. The diagnostics system of claim 8 wherein said first predetermined count is a function of said current error.

15. The diagnostics system of claim 8 wherein said second predetermined count is a function of said current error.

16. A storage medium encoded with a machine-readable computer program code for ascertaining status of an electric machine coupled to a polyphase bus, said storage medium including instruction for causing a controller to implement a diagnostics method comprising:

detecting a rotational position of said electric machine with a position encoder coupled to said electric machine;

controlling an inverter comprising a plurality of switching devices, said inverter having an input coupled to a direct current bus and an output coupled to said polyphase bus, said inverter responsive to commands from a controller coupled to said inverter and to said position encoder;

measuring a current from said direct current bus;

capturing a torque current;

calculating a current error establishing a bound limit for said torque current;

comparing said current error value to said bound limit;

determining whether a fault exists by evaluating if said bound limit has been exceeded and generating a current error;

incrementing a fault counter by a first predetermined count if said fault exists;

decrementing said fault counter by a second predetermined count if no fault exists; and indicating a failure if said fault counter exceeds a predetermined limit.

17. The storage medium of claim 16 wherein said electric machine comprises a permanent magnetic motor and said position encoder includes a rotor position sensor.

18. The storage medium of claim 16 wherein said electric machine is a permanent magnet DC brushless motor characterized by a sinusoidal magnetic field excitation.

19. The storage medium of claim 16 wherein said current error is determined by subtracting from the torque current a value representative of a current command.

20. The storage medium of claim 16 wherein said bound limit is compensated for motor speed.

21. The storage medium of claim 16 wherein said first predetermined count is a function of said current error.

22. The storage medium of claim 16 wherein said second predetermined count is a function of said current error.

23. A computer data signal embodied in a carrier wave for ascertaining status of an electric machine coupled to a polyphase bus, said data signal comprising code configured to cause a controller to implement a diagnostics method comprising:

detecting a rotational position of said electric machine with a position encoder coupled to said electric machine;

controlling an inverter comprising a plurality of switching devices, said inverter having an input coupled to a direct current bus and an output coupled to said polyphase bus, said inverter responsive to commands from a controller coupled to said inverter and to said position encoder;

measuring a current from said direct current bus;

capturing a torque current;

calculating a current error establishing a bound limit for said torque current;

comparing said current error value to said bound limit;

determining whether a fault exists by evaluating if said bound limit has been exceeded and generating a current error;

incrementing a fault counter by a first predetermined count if said fault exists;

decrementing said fault counter by a second predetermined count if no fault exists; and indicating a failure if said fault counter exceeds a predetermined limit.

24. The computer data signal of claim 23 wherein said electric machine comprises a permanent magnetic motor and said position encoder includes a rotor position sensor.

25. The computer data signal of claim 23 wherein said electric machine is a permanent magnet DC brushless motor characterized by a sinusoidal magnetic field excitation.

26. The computer data signal of claim 23 wherein said current error is determined by subtracting from the torque current a value representative of a current command.

27. The computer data signal of claim 23 wherein said bound limit is compensated for motor speed.

28. The computer data signal of claim 23 wherein said first predetermined count is a function of said current error.

29. The computer data signal of claim 23 wherein said second predetermined count is a function of said current error.

* * * * *